S. C. KENNARD.
Board Measure.
No. 19,031.   Patented Jan. 5, 1858.
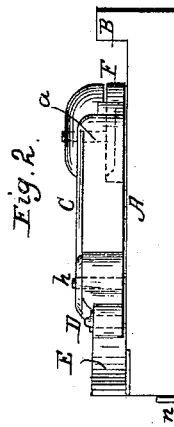
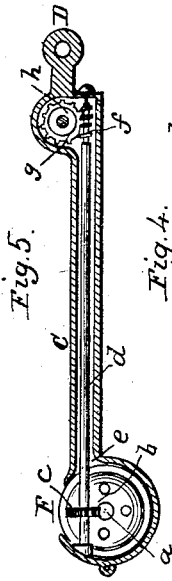
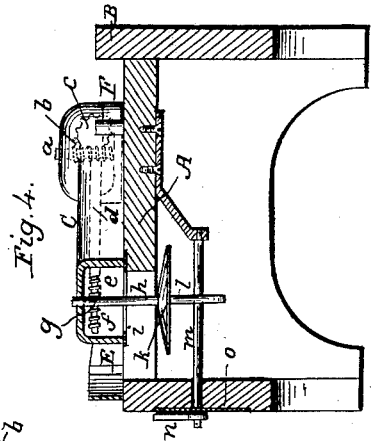
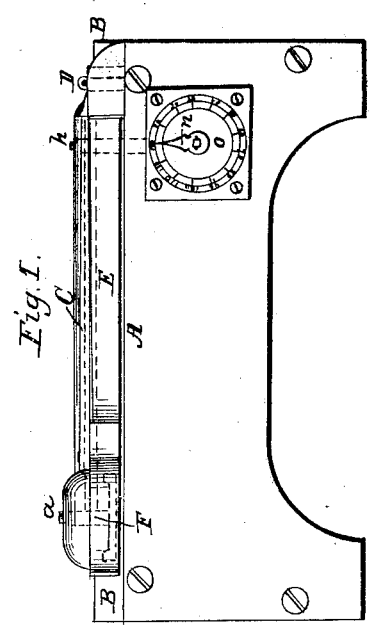
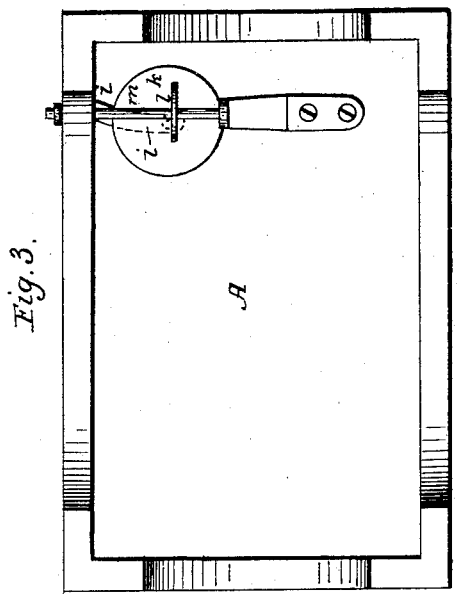

UNITED STATES PATENT OFFICE.

SENECA C. KENNARD, OF SOUTH NEW MARKET, NEW HAMPSHIRE.

MACHINE FOR MEASURING THE SUPERFICIES OF BOARDS.

Specification of Letters Patent No. 19,031, dated January 5, 1858.

*To all whom it may concern:*

Be it known that I, SENECA C. KENNARD, of South New Market, in the county of Rockingham and State of New Hampshire, have invented a new and useful Machine or Apparatus for Measuring the Superficial Area of Boards That May Pass Through a Planing-Machine, &c.; and I do hereby declare that the same is fully described and represented in the following specification and the accompanying drawings, of which—

Figure 1, denotes a side view of the said machine. Fig. 2, is a front elevation of it. Fig. 3, an underside view of it. Fig. 4, a transverse and vertical section taken through the shaft of the indicator. Fig. 5, is a horizontal section of the movable lever and the mechanism contained within it.

In the drawings above mentioned, A, represents a table or the flat surface or bed of a planing machine having my apparatus applied to it, such table being furnished with a straight ledge, B, or its equivalent arranged on and above its upper surface as shown in Figs. 1 and 4.

C, is a movable lever, arranged on the top of the table, and made to turn at or near one of its ends on a fulcrum or pin, D, extending from the top surface of the table, the movement of the said lever being such as to cause its other end to approach toward or recede from the ledge, B, as circumstances may require. A spring, E, arranged as shown in Fig. 1, operates to press the lever, C, toward the ledge, B. The lever is made hollow or with a space, e, within it for the reception of certain parts of the mechanism carried by the said lever such mechanism being as follows.

In the front end of the lever is a wheel or roller, F, whose periphery projects out of the lever laterally a short distance, the said roller turning freely in a horizontal direction, and being supported on an upright shaft, a. This shaft carries a worm or endless screw, b, which engages with a worm gear, c, fixed on a long shaft, d, extending longitudinally through the space or chamber, e, formed within the lever, C. Near its rear end, the shaft is furnished with an endless screw, f, that operates in a worm gear, g, fixed on a vertical shaft, h, that extends downward from the lever, C, as shown in Fig. 4, and through a curved slot i, made in the table as represented in Fig. 4, and also in Fig. 3, by dotted lines. This shaft at its lower end carries a horizontal disk or circular plate, k, such disk, its shaft, the worm gear, g, the screw, f, shaft, d, the worm gear, c, the screw, b, shaft, a, and the wheel or roller, F, constituting together that element or part of my invention which I term the mechanism carried by the lever, C.

The remaining portion of my machine, may be termed, "the indicator apparatus." It consists as follows: 1st, of a wheel, l, whose periphery is arranged in contact with the lower surface of the disk, k. 2nd, a horizontal shaft, m, on which said wheel is fixed. 3rd, an index pointer, n, fixed on the shaft. 4th, an index or divided plate, o, engraved with circles, figures, and divisions or their equivalents, such as may be sufficient to indicate the superficial area of boards that may be run through the machine.

In operating with the said machine, a board to be measured by it is laid on the top surface of the table, A, and with one edge close against the inner surface of the ledge B, the other edge of the board being pressed upon by the lever, C, or the wheel F, thereof. If under these circumstances a board be moved endwise through the machine, the roller, F, will be put in revolution and will communicate motion to the disk, k, which in its turn will rotate the wheel, l, whereby motion will be imparted to the index pointer, n, on the divided limb or index plate, o.

Whenever the lever, C, is moved away from the ledge, B, the disk, k, will also be moved on the edge of the wheel, l. In moving the lever, C, away from the ledge, B, the wheel, F, and disk, k, will be simultaneously moved with the lever their relative distances of movement being in the ratio of the axles of the wheel and disk from the axis of the fulcrum of the lever.

The ratio of rotary movement of the wheel, l, will be in proportion to its distance from the axis of the disk, k. Consequently, the velocity of movement of the wheel, l, will be increased in proportion to the increase of width in the boards run through the machine and decreased in proportion to the decrease in such width, or in other words, such velocity will be the greater as the wheel, F, is moved away from the ledge, B. Therefore, it will be seen that the movement of the lever occasioned by the width of any board run between it and the ledge, will so adjust the disk, k, to the wheel, l, as to cause the index pointer to be moved as much faster on the index plate as will be necessary to indicate the superficial area of board moved along by the wheel, F. Thus, if the index plate is properly divided, the pointer, n, will indicate on it at any time the number of superficial feet of boards which may have been run through the machine, however such boards may have varied in their respective widths.

Having thus described my invention what I claim is—

The combination of the stationary ledge, B, or its equivalent, the arm or lever, C, the mechanism carried by such lever and the indicator apparatus, the whole being constructed and made to operate substantially in manner and for the purpose above set forth.

In testimony whereof I have hereunto set my signature this eighth day of October A. D. 1857.

SENECA C. KENNARD.

Witnesses:
R. H. EDDY,
F. R. HALE, Jr.